US007272800B2

(12) United States Patent
Roth et al.

(10) Patent No.: US 7,272,800 B2
(45) Date of Patent: Sep. 18, 2007

(54) MESSAGE ANALYSIS DEVICE AND METHOD FOR DISPLAYING MESSAGES

(75) Inventors: Michael Roth, Ottobrunn (DE); Andreas Michl, Munich (DE); Thomas Lang, Pertershausen (DE); Stephan Sandhaeger, Germering (DE)

(73) Assignee: Rohde & Schwarz GmbH & Co. KD, Munich (DE)

( * ) Notice: Subject to any disclaimer, the term of this patent is extended or adjusted under 35 U.S.C. 154(b) by 225 days.

(21) Appl. No.: 10/504,032

(22) PCT Filed: Jan. 30, 2003

(86) PCT No.: PCT/EP03/00946

§ 371 (c)(1),
(2), (4) Date: Feb. 11, 2005

(87) PCT Pub. No.: WO03/067815

PCT Pub. Date: Aug. 14, 2003

(65) Prior Publication Data

US 2005/0132053 A1 Jun. 16, 2005

(30) Foreign Application Priority Data

Feb. 5, 2002 (DE) ............................. 102 04 657

(51) Int. Cl.
*G06F 3/048* (2006.01)
(52) U.S. Cl. .................... 715/804; 715/853; 715/810; 715/817; 715/823
(58) Field of Classification Search ................ 715/853, 715/804
See application file for complete search history.

(56) References Cited

U.S. PATENT DOCUMENTS 5,832,495 A * 11/1998 Gustman ................... 707/102

(Continued)

FOREIGN PATENT DOCUMENTS

JP 11-55710 A 2/1999

(Continued)

OTHER PUBLICATIONS

Hood, Earl: "Mhonarc", Online; Jan. 31, 1997, pp. 1-53, XP002244692 (http://www.mhonarc.org/).
Hood, Earl: "Mhonarc", pp. 1-5, XP000864228 (http://web.archive.org/web/20020121054918/http://mhonarc.org/).

(Continued)

*Primary Examiner*—John Cabeca
*Assistant Examiner*—Nicholas S Ulrich
(74) *Attorney, Agent, or Firm*—Ditthavong Mori & Steiner, P.C.

(57) ABSTRACT

A message analysis device is described including a storage device, display device, and a selection device. The storage device can be used to store messages in a file in chronological order, and the a display device can be used to display at least one first and one second window. One part of the messages, which are chronologically stored in the file, can be displayed in the first window. The selection device can be used to select at least one message to be displayed in the second window, corresponding to a parent and/or child generation of a specific message. Accordingly, information can be evaluated from a message header to determine and represent those parent-generation messages that causally triggered a specific message and/or those child-generation messages that are causally determined by the specific message.

13 Claims, 6 Drawing Sheets

U.S. PATENT DOCUMENTS

| | | | |
|---|---|---|---|
| 5,832,502 A * | 11/1998 | Durham et al. | 707/104.1 |
| 6,006,227 A * | 12/1999 | Freeman et al. | 707/7 |
| 6,049,666 A | 4/2000 | Bennett et al. | |
| 6,330,589 B1 | 12/2001 | Kennedy | |
| 2001/0030666 A1 | 10/2001 | Okada | |
| 2002/0019827 A1* | 2/2002 | Shiman et al. | 707/200 |
| 2002/0046220 A1* | 4/2002 | Freeman et al. | 707/501.1 |
| 2002/0059272 A1* | 5/2002 | Porter | 707/100 |
| 2002/0070984 A1* | 6/2002 | Newman | 345/853 |
| 2002/0167538 A1* | 11/2002 | Bhetanabhotla | 345/700 |
| 2003/0033287 A1* | 2/2003 | Shanahan et al. | 707/3 |
| 2003/0101065 A1* | 5/2003 | Rohall et al. | 705/1 |
| 2003/0164856 A1* | 9/2003 | Prager et al. | 345/764 |
| 2004/0205448 A1* | 10/2004 | Grefenstette et al. | 715/500 |
| 2005/0022114 A1* | 1/2005 | Shanahan et al. | 715/513 |

FOREIGN PATENT DOCUMENTS

WO     WO99/48011     9/1999

OTHER PUBLICATIONS

"Thread Index" (http://web.archive.org/web/20010711222843/www.apsfilter.org/Lists-Archives/apsfilter-help-0101/threads.html) XP000864241.

"Date Index" (http://web.archives.org/web/20010306204420/www.apsfilter.org/Lists-Archives/apsfilter-help-0101/maillist.html) XP000864242.

Mail from A. Klemm (http://web.archive.org/web/20010306204245/www.apsfilter.org/Lists-Archives/apsfilter-help-0101/msg00006.html) XP000864243.

* cited by examiner

Fig. 3

MESSAGE ANALYSIS DEVICE AND METHOD FOR DISPLAYING MESSAGES

FIELD OF THE INVENTION

The invention relates to a message analysis device and a method for displaying causally related messages.

BACKGROUND OF THE INVENTION

In the development of new appliances or software generations for existing appliances, it is necessary to check the results of the development by means of the message flow. From the consequently obtained findings, conclusions can be drawn with respect to defective developments or possible improvements can be proposed. In order to enable an analysis of the message flow, it is normal to store the messages occurring for example in an end system of a communications system, such as mobile radio, in a file. In the case of an end system constructed for example according to the OSI reference model, messages are generated thereby between various layers of the reference model on the basis of the provided services. These messages are written either directly from the layers into the file or by means of a so-called "framework" which is provided separately for this purpose.

With respect to the OSI reference model, reference may be made for example to Jürgen Göbel, "Communications Technology", ISBN 3-7785-3904-3, 1999, part I, pages 713-753.

On the basis of the described mode of operation, the messages are arranged in the file in chronological sequence. By means of an analyzer, it is possible to view a thus generated file. The messages stored in the file are displayed in tabulated form and can be analyzed by a developer.

It is disadvantageous in the described system that the tabulated display of the individual messages offers no insight into the causal connections of the messages. Hence, it is extremely difficult for a developer to analyze the message flow since it itself must look for messages which are related with respect to content. With the multiplicity of messages, which are stored in such a file, this leads to a considerable time and hence also cost outlay.

SUMMARY OF THE INVENTION

A need therefore exists to produce a message analysis device and a method for displaying messages, with which the message flow of causally related messages can be analyzed simply, and also to indicate a corresponding computer program and computer program product.

In the case of the message analysis device according to the invention and also in the case of the method for displaying related messages, it is advantageous that, in conjunction with the message, information stored in the file is used for the purpose of selecting a plurality of messages which are connected to each other causally. In this manner, it is possible to detect with a glance which further messages are connected to a specific message because they were generated for example as a consequence of the specific message. With respect to the time scale, such a mode of operation is possible in both directions so that not only succeeding messages, generated on the basis of a specific message, can be displayed but likewise messages preceding the specific message are displayed.

It is particularly advantageous according to a development of the invention that, in addition to the messages, directly preceding and succeeding the specific message, which are designated as messages of the parent generation or respectively of the child generation, the in turn preceding or respectively succeeding messages can be displayed. Due to the feedback of the thus displayed generations of messages, it is advantageous in addition that, in the case of a selection of a specific further message for the display of the chronological listing of messages, that sequence is selected which contains the specific further message. Hence, a detailed analysis can be undertaken not only with respect to the sequence of messages which have a causal connection but also with respect to the individual, causally connected messages.

Still other aspects, features, and advantages of the present invention are readily apparent from the following detailed description, simply by illustrating a number of particular embodiments and implementations, including the best mode contemplated for carrying out the present invention. The present invention is also capable of other and different embodiments, and its several details can be modified in various obvious respects, all without departing from the spirit and scope of the present invention. Accordingly, the drawing and description are to be regarded as illustrative in nature, and not as restrictive.

BRIEF DESCRIPTION OF THE DRAWINGS

A preferred embodiment of the invention is represented in the drawings and is explained in more detail by means of the subsequent description. There are shown:

FIG. 3 an illustration of a first screen view with messages of a parent and of a child generation;

DETAILED DESCRIPTION OF THE PREFERRED EMBODIMENT

Figure 1:
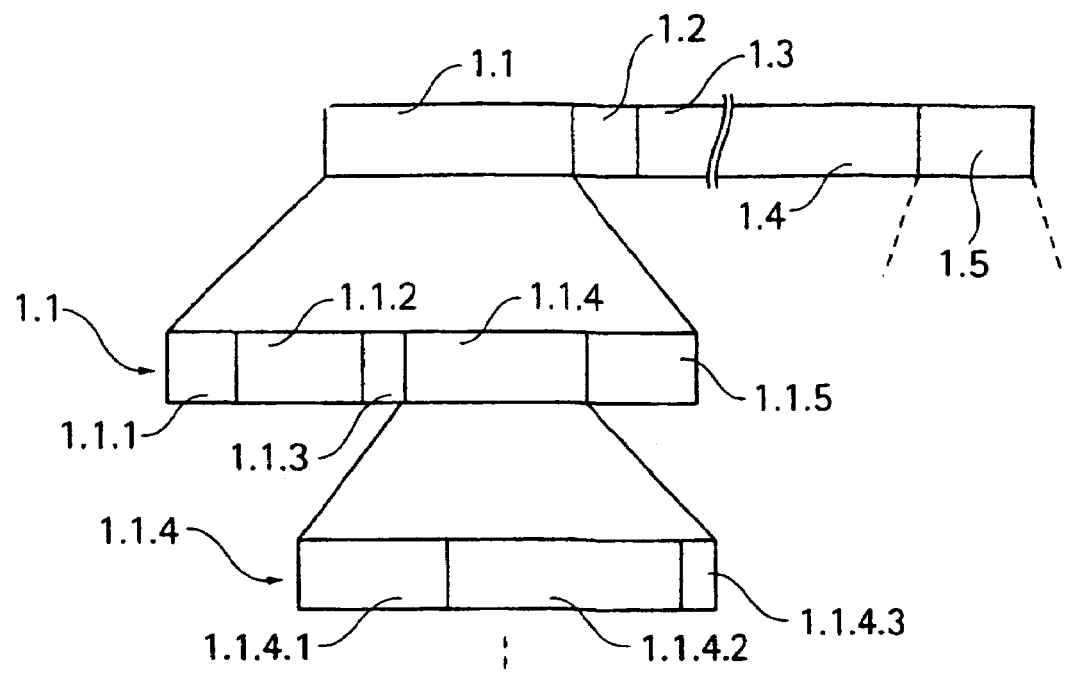
FIG. 1 a schematic illustration of the structure of a message with a modular structure.

Before an example of the message analysis device according to the invention is explained by means of FIG. 3 to 6, firstly the structure of messages with a modular structure is intended to be explained by means of FIG. 1 for better comprehension.

A message 1, as is generated for example in the case of service provision by one of the layers according to the OSI reference model, comprises a plurality of segments which are designated in FIG. 1 with 1.1, 1.2, 1.3, 1.4 and 1.5. For the first segment 1.1, a further division into blocks 1.1.1, 1.1.2, 1.1.3, 1.1.4 and 1.1.5 is illustrated. The remaining segments of the complete message 1 can likewise be divided into such blocks. The individual blocks of the segment 1.1 of the message 1 can likewise in turn be sub-divided into smaller units 1.1.4.1, 1.1.4.2 and 1.1.4.3. Due to the illustrated sub-division into ever smaller information units, a hierarchical system of a message 1 is produced, which system reflects their modular structure. The messages I to be analyzed by the present invention have such a modular structure, the combination of individual modules into superordinate structures on the basis of a logical relationship of modules being undertaken. The messages 1 represent for example elements of a data stream which is exchanged between a base station and a mobile radio station in a cellular mobile radio network.

Figure 2:
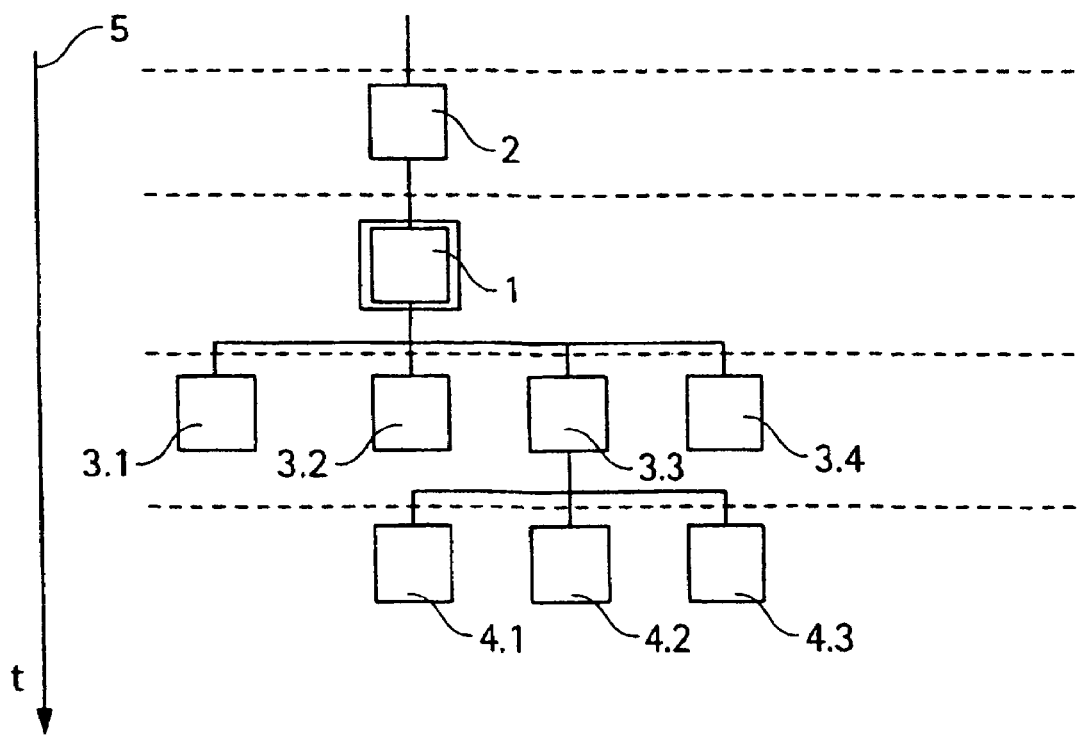
FIG. 2 a temporal sequence of a plurality of generations of messages.

In FIG. 2, starting from a specific message 1, a message flow over a plurality of generations is illustrated. A message 2 of a parent generation preceded the message 1. The specific message 1 itself has been triggered on the basis of the content of the message 2 of the parent generation. As illustrated by the connection lines, the message 1 is in turn the cause of the triggering of further messages 3.1, 3.2, 3.3 and 3.4 which belong to a child generation. The messages 3.1 to 3.4 of the child generation can for their part be responsible in turn causally for triggering further messages 4.1, 4.2 and 4.3 as is illustrated by way of example for the message 3.3 of the child generation.

Due to the grouping of the individual messages, which are connected causally with respect to the generation sequence, a temporal sequence of the messages is produced which is indicated by means of a time axis 5. The messages 3.1, 3.2, 3.3 and 3.4 of the child generation or respectively the succeeding messages 4.1, 4.2 and 4.3, which are arranged simultaneously in the illustration, are listed however in the file in succession. Correspondingly, the entries are also displayed in succession in a tabulated overview. Between the individual messages of the various generations, which are illustrated in FIG. 2, a multiplicity of other messages is stored in the file. The temporal conjunction of such messages is extensively random so that, on the basis of the multiplicity of messages generated within the shortest time, the causal connection between individual messages is not detectable in the chronological listing.

Figure 3:
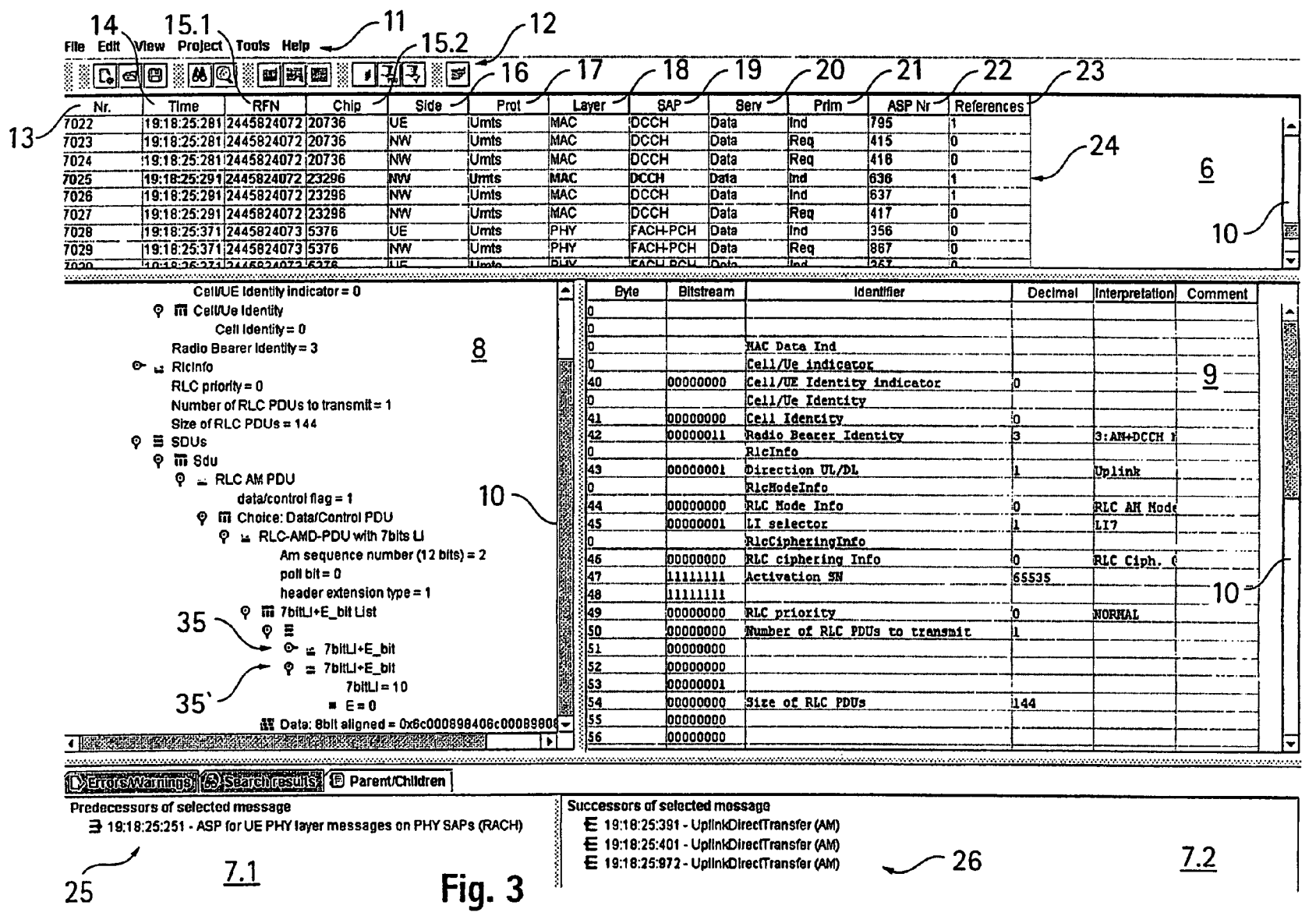

In FIG. 3, a representation of a screen view of the message analysis device is shown. A first window 6 is detectable in the screen display in which window a multiplicity of messages corresponding to their chronological sequence, which corresponds to the sequence of entries in the files, are listed. By selecting a message by means of a suitable selection medium, e.g. a computer mouse, a specific message 24 is highlighted in the tabulated listing. The message 24 highlighted in bold corresponds to the message 1 from FIG. 2. If a message precedes the specific message 24, on the basis of which the specific message 24 has been produced, then this preceding message, which is designated as a message 25 of the parent generation, is displayed in a second window. The second window is thereby sub-divided into a first region 7.1 and a second region 7.2. The display of the message 25 of the parent generation is thereby effected in the first region 7.1.

If succeeding messages have been triggered on the basis of the specific message 24, then these are displayed in the second region 7.2. In the illustrated case example, the message 25 preceded the specific message 24. On the basis of the specific message 24, three further messages 26 were generated which are displayed in the second region 7.2 of the second window 7. As can be detected in FIG. 3 by means of the time entries 26.1 of the messages 26 of the child generation, the three messages 26, which are associated with the child generation, do not occur simultaneously so that there is a high probability that, in the listing of the three messages 26 of the child generation in the file, a multiplicity of further messages is listed between the messages 26.

The columns of the table displayed in the first window 6 can be adjusted via a non-shown selection menu. In the illustrated example, the current number of the respective message in the file is displayed in a first column 13. In a second column 14, a real time is displayed at which the corresponding message was stored in the file. In two further columns 15.1 and 15.2, the time is stored as internal time, for instance as system time. A fifth column 16 characterizes the side from which the message was sent, i.e. for example the base station or mobile telephone. Since the message analysis device is not connected to a specific protocol system, the respectively underlying protocol is mentioned in a sixth column 17. The columns with the reference numbers 18 to 21 contain information which is produced by the layer-wise structure of the end system according to the OSI reference model. In a further column 22, an ASP number is noted, by means of which the messages can be categorized, which therefore permits a non-unequivocal identification of an individual message. In a final displayed column 23, an entry is provided under the title "references", with which it can be determined whether a message triggering the message preceded the message.

The sequence view of messages displayed in the first window 6 contains the information of the message head, the so-called header, as already indicated, the displayed information being able to be adjusted via a non-shown selection window. A structure display is displayed in a third window 8 for the message 24 highlighted respectively in the first window 6. The individual hierarchical levels, which were mentioned already with respect to FIG. 1, are made obvious in the structure display by indentations. If the hierarchically subordinate levels for a specific element are intended to be on or off screen, then this can be carried out by clicking on the corresponding element in the display. In FIG. 3, such an element, with the reference number 35, is displayed without displaying the subordinate hierarchical levels and also an identically constructed element 35' with a display of all subordinate hierarchical levels.

In a fourth window 9, a detailed view of the highlighted message 24 is displayed. If the information to be displayed goes beyond the visible range of the fourth window 9, then the displayed visible portion can be varied in the known manner by means of a scroll bar 10. This applies analogously for the remaining windows 6, 7 and 8.

Figure 4:
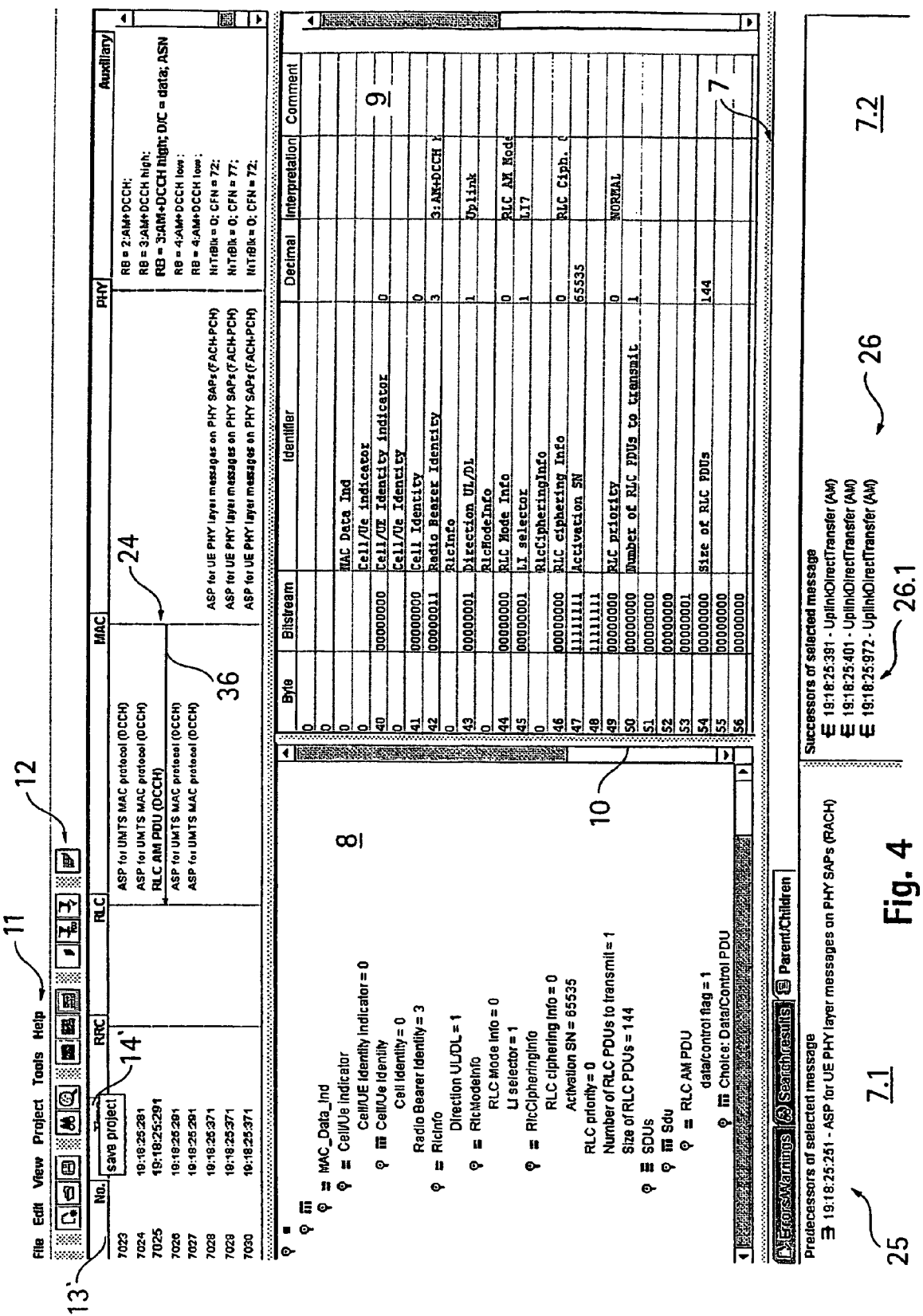
FIG. 4 a second illustration of a screen view with messages of a parent and of a child generation.

In FIG. 4 an alternative display form of the chronological listing of the messages in the first window 6 is shown. The messages are in turn listed line-wise but, in contrast to the tabulated display of FIG. 3, origin and destination of the individual messages is displayed graphically. In addition to the two first columns 13' and 14', which correspond to the previously mentioned columns 13 and 14 in FIG. 3, further columns are illustrated which are designated with "RRC", "RLC", "MAC", "PHY" and "Auxiliary". Due to the corresponding arrangement of the information of a message in the corresponding column, for the highlighted message 24, i.e. the column "MAC", that layer in which the message is generated is immediately made clear graphically. Together with the direction arrow 36, which is disposed thereunder, the destination of the respective message is also detectable. In the column "Auxiliary", additional information is however contained. The information displayed in the third window relating to the structure of the message 24 differs from FIG. 3 by means of the region of the display which is displaced by means of the scroll bar 10.

Figure 5:
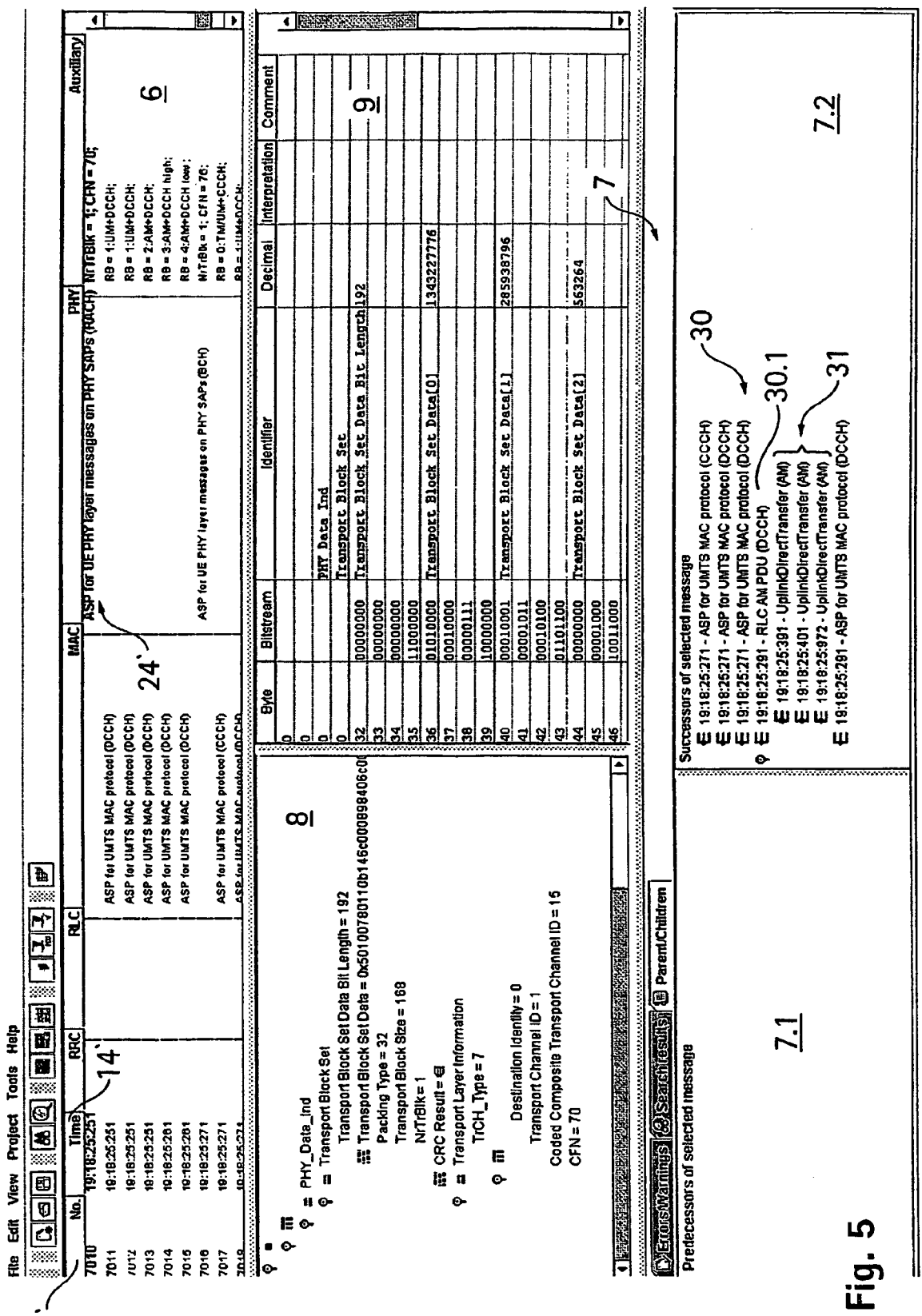
FIG. 5 an illustration of a screen view with messages of a child generation and messages of a succeeding generation.

FIG. 5 shows a further display in the case where the highlighted message 24', in addition to a plurality of messages 30 of the child generation which are indicated in the second region 7.2 of the second window 7, contains yet further messages of a succeeding generation which were triggered on the basis of a message 30.1 of the child generation. This is made clear optically by the indented display in the second region 7.2.

Figure 6:
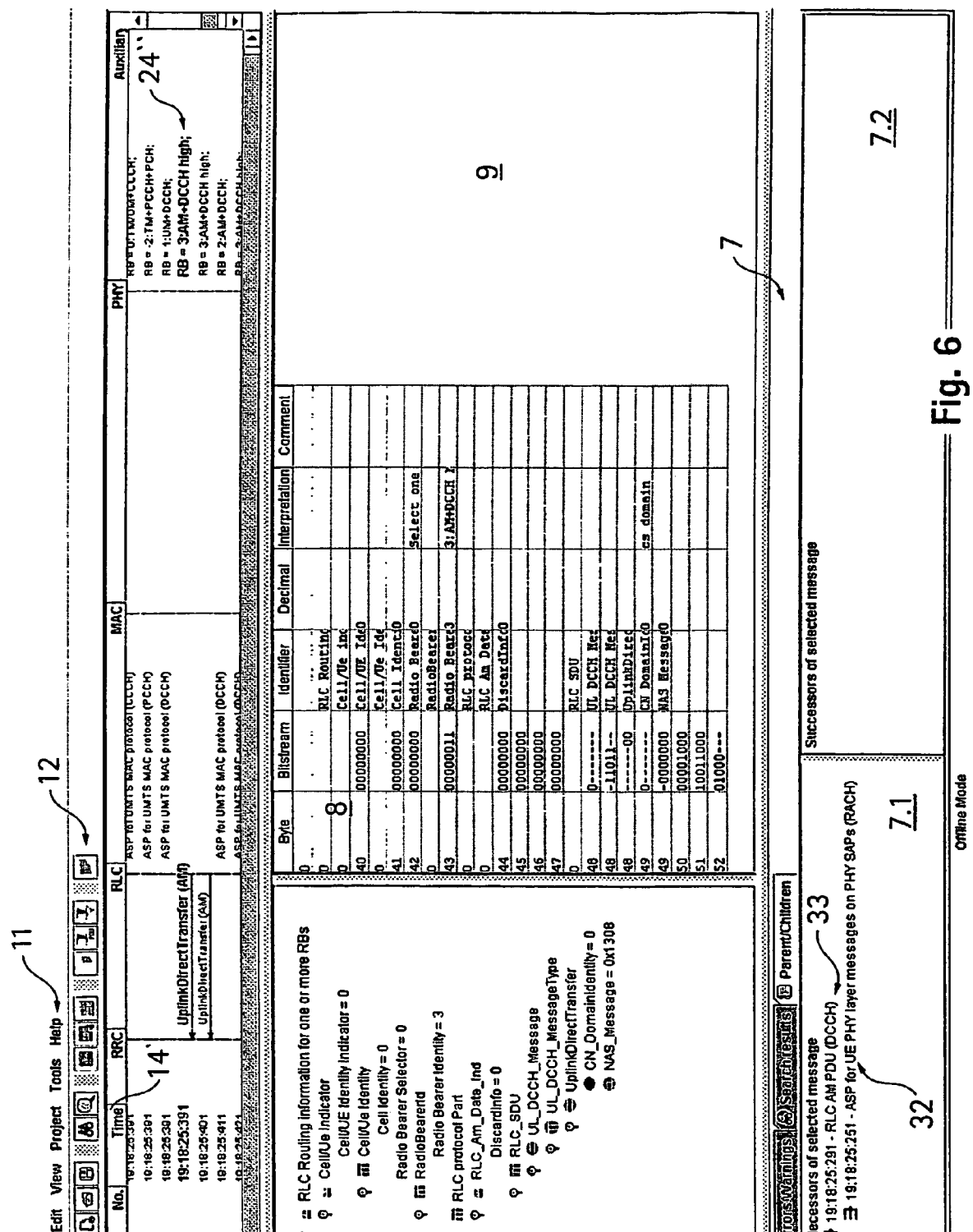
FIG. 6 an illustration of a screen view with a message of a parent generation and also of a generation preceding the parent generation.

In FIG. 6, the analogous case for a plurality of generations of preceding messages is illustrated so that a message 32 of the parent generation preceding the highlighted message 24" was in turn triggered by a message 33 of the generation preceding the parent generation.

In order to select messages which, in the described manner, have a causal connection with a specific message 24, 24' or 24" which is highlighted in the first window 6, the header information is evaluated. In the header, entries are undertaken in the file during storage of the respective message, by means of which entries of the causal connection and hence the history of the individual messages can be reconstructed. By means of a selection device, the messages of parent or child generations, which are identified on the basis of the information of the header, are selected and displayed in the second window 7 in the first or second region 7.1 or 7.2, dependent upon whether the respective message concerns a message of a preceding or succeeding generation.

If in the second window 7 a message of the parent or of the child generation or other information displayed there is selected by means of a selection medium, then in the first window 6, that part of the chronological listing of messages is automatically displayed which contains the newly selected message. The newly selected message is thereupon highlighted in the first window 6. Corresponding to the newly highlighted message of the first window, the displays are updated in the remaining windows 7, 8 and 9.

Figure 7:
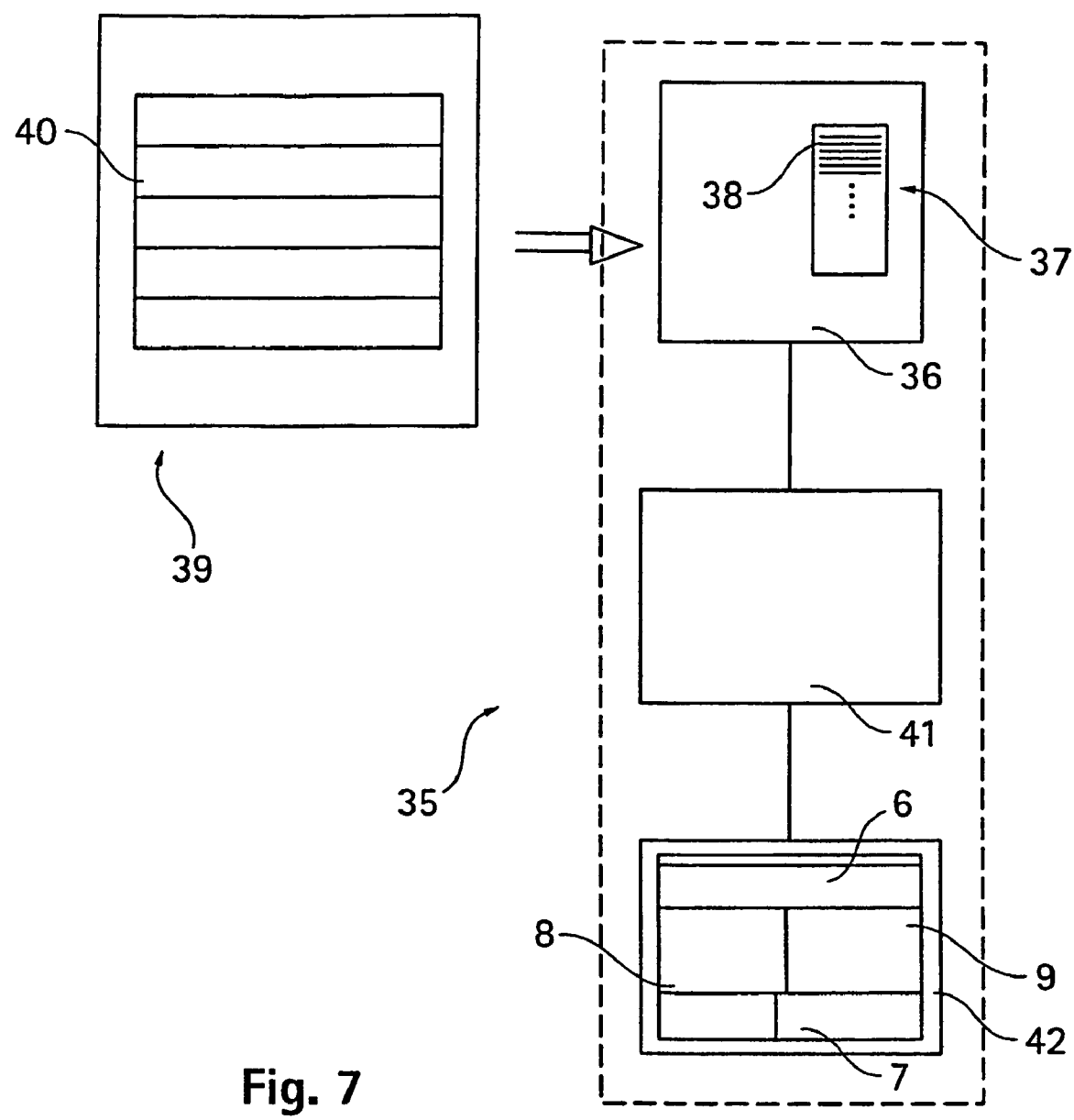
FIG. 7 a block diagram of the message analysis device according to the invention.

FIG. 7 shows the total structure of the message analysis device according to the invention. The message analysis device comprises a storage device 36 in which a file 37 is stored, in which in turn the messages 38 are stored in chronological sequence. The messages 38 are stored in the file 37 via a non-displayed interface of the end system 39 which comprises for example the seven layers 40 of the OSI reference model. Furthermore, the message analysis device 35 has a selection device 41 which is connected to the storage device 36 so that the selection device 41 can access the file 37 of the storage device 36. Corresponding to the above-described selection criterion, a selection of messages to be displayed from the file 37 is implemented by the selection device 41, which messages preceded or succeeded a specific message which is highlighted in the first window 6 of the display device 42, and is issued to the display device 42. Corresponding to the information transmitted from the selection device 41 to the display device 42, a display is effected in the second window 7, as already explained in the description of FIG. 3 to 6.

While the present invention has been described in connection with a number of embodiments and implementations, the present invention is not so limited but covers various obvious modifications and equivalent arrangements, which fall within the purview of the appended claims.

What is claimed is:

1. A method for displaying causally related messages of a data flow stored in a file corresponding to a temporal sequence of the messages, said method comprising:
   highlighting a selected message in a first window in which the messages are listed in chronological sequence;
   evaluating header information of the highlighted message and establishing whether at least one message of a parent generation relating to and causally triggering the highlighted message exists and/or whether at least one message of a child generation triggered causally by the highlighted message exists;
   displaying said at least one message of the parent generation in a first region of a second window and said at least one of message of the child generation in a second region of the second window and simultaneously; and
   displaying a hierarchical system of the highlighted message in a third window, the display of the hierarchical system of a message concerning the inner modular construction of a message.

2. A method according to claim 1, further comprising:
   displaying, in addition to a displayed message of the child generation, at least one message of the generation succeeding the child generation and connected causally to the displayed message of the child generation.

3. A method according to claim 1, further comprising:
   displaying, in addition to a displayed message of the parent generation, at least one message of the generation preceding the parent generation and connected causally to the displayed message.

4. A method according to claim 2, further comprising:
   indenting display of the messages of a succeeding generation, displayed in the second window, with respect to the messages of the preceding generation.

5. A method according to claim 1, wherein:
   displaying in the first window, upon selecting one of the messages, displayed in the second window, a part of the chronological sequence of messages that contains the message selected in the second window and highlighting the selected message is highlighted in the first window.

6. A method according to claim 1, further comprising:
   repeating said highlighting, evaluating, and displaying upon a change of the highlighted message in the first window.

7. A computer or digital signal process configured to execute a computer program with program code means for implementing the steps of the method according to claim 1.

8. A message analysis device for analyzing causally related messages from a quantity of messages of a data stream, the message analysis device comprising:
   a storage device for storing messages and the messages being stored in a file of the storage device in chronological sequence,
   a display device for displaying at least a first window, a second window, and a third window, and, in the first window, a part of the messages stored chronologically in the file being able to be displayed, and
   a selection device for selecting at least one message of a parent generation which is to be displayed in a first region of the second window of the display device, and a message of a child generation of a specific message which is to be displayed in the second window of the display device, the specific message being triggered causally by the message of the parent generation and, for said part, triggering the message of the child generation causally and being displayed highlighted in the first window and a hierarchical system of the specific message being displayed simultaneously in the third window, the display of the hierarchical system of message concerning the inner modular construction of a message.

9. A message analysis device according to claim 8, wherein:
   at least one message of a generation succeeding the child generation is selectable by the selection device in addition to a message of the child generation and triggered causally by the message of the child generation.

10. A message analysis device according to claim 8, wherein:
at least one message of a generation preceding the parent generation is selectable by the selection device in addition to a message of the parent generation causally triggering the message of the parent generation.

11. A message analysis device according to claim 9, wherein:
messages of succeeding generations are displayed indented in order to display the relationship of the messages to their respective generation.

12. A message analysis device according to claim 8, wherein:
in the case of a selection of a message, displayed in the second window, that portion of chronological messages of the file is displayed in the first window, which portion contains the selected message.

13. A message analysis device according to claim 12, wherein:
the selected message can be interpreted by the selection device as a new, specific message and the display can be updated correspondingly in the second window.

* * * * *